United States Patent [19]
Banerjee

[11] Patent Number: 5,109,493
[45] Date of Patent: Apr. 28, 1992

[54] STRUCTURE AND METHOD FOR TYING DOWN AN UNUSED MULTI-USER BUS

[75] Inventor: Biswa R. Banerjee, San Jose, Calif.

[73] Assignee: Poget Computer Corp., Santa Clara, Calif.

[21] Appl. No.: 373,436

[22] Filed: Jun. 30, 1989

[51] Int. Cl.⁵ .............................................. G06F 1/32
[52] U.S. Cl. ........................... 395/325; 395/750; 364/DIG. 2; 364/926.91; 364/935.42; 364/935.44; 364/935.48; 364/948.4
[58] Field of Search .................. 364/200, 900

[56] References Cited

U.S. PATENT DOCUMENTS

| | | | |
|---|---|---|---|
| 4,430,584 | 2/1984 | Someshwar et al. | 364/900 |
| 4,430,724 | 2/1984 | Hamilton et al. | 364/900 |
| 4,454,591 | 6/1984 | Lou | 364/900 |
| 4,706,082 | 11/1987 | Miesterfeld et al. | 340/825.5 |
| 4,719,458 | 1/1988 | Miesterfeld et al. | 340/825.5 |
| 4,750,177 | 6/1988 | Hendrie et al. | 364/200 |
| 4,766,334 | 8/1988 | Warner | 307/540 |
| 4,827,471 | 5/1989 | Geiger et al. | 370/85.1 |
| 4,937,734 | 6/1990 | Bechtolsheim | 364/200 |

OTHER PUBLICATIONS

"80C88 CMOS 8/16-Bit Microprocessor," *Digital Product Data Book*, Harris, pp. 3-81 to 3-105 (1988).

*Primary Examiner*—Gareth D. Shaw
*Assistant Examiner*—Matthew C. Fagan
*Attorney, Agent, or Firm*—Skjerven, Morrill, MacPherson, Franklin & Friel

[57] ABSTRACT

A circuit for tying down a computer bus when the bus is idle by monitoring a series of signals which indicate whether the bus is being used and storing the data signal values on the bus, such that when the bus goes idle the last data value on the bus immediately prior to the bus becoming idle is applied to the bus to hold it at its last known signal value. When a new bus operation is initiated the bus is automatically released for normal operation.

7 Claims, 13 Drawing Sheets

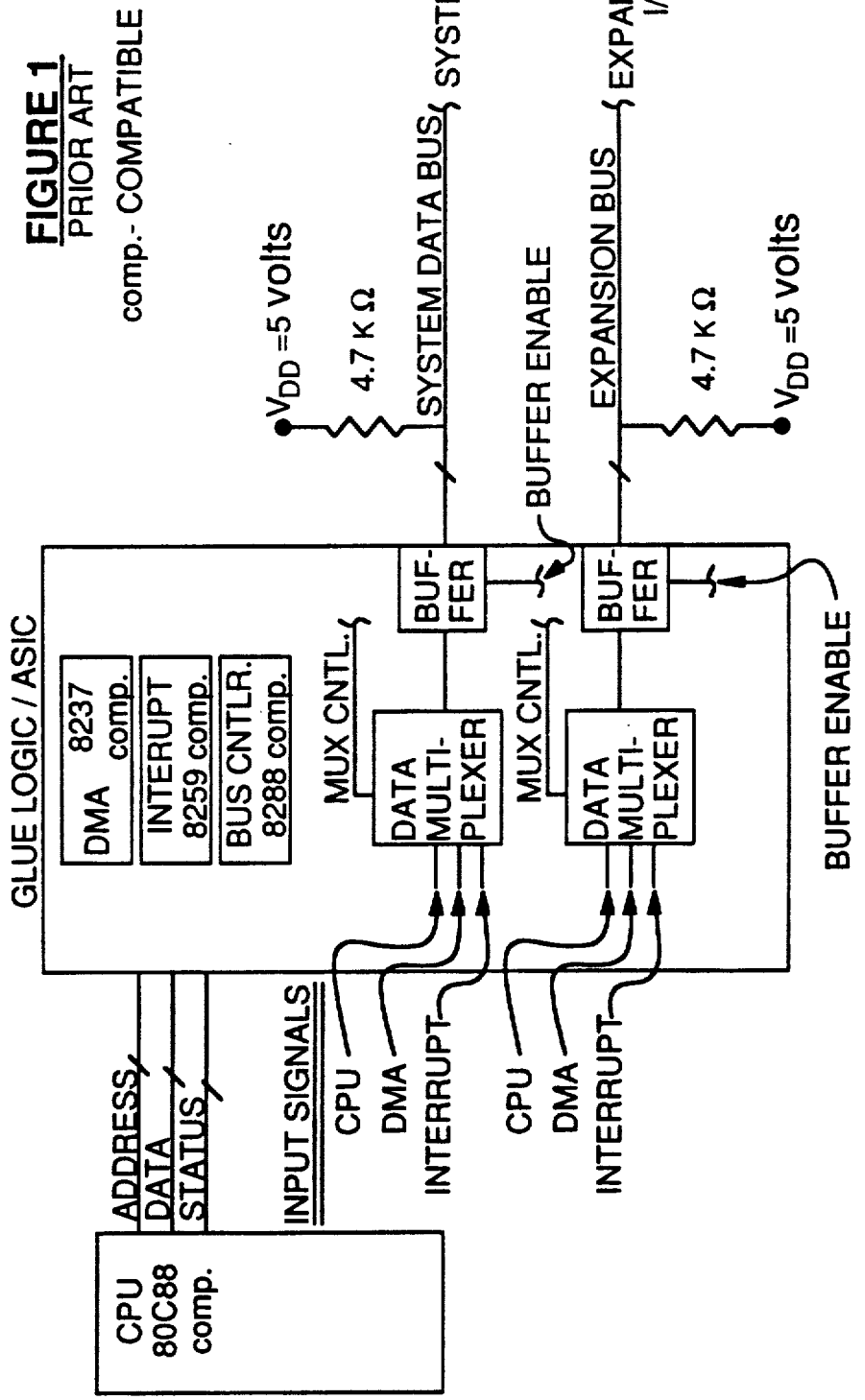

BUS HOLD CIRCUITRY

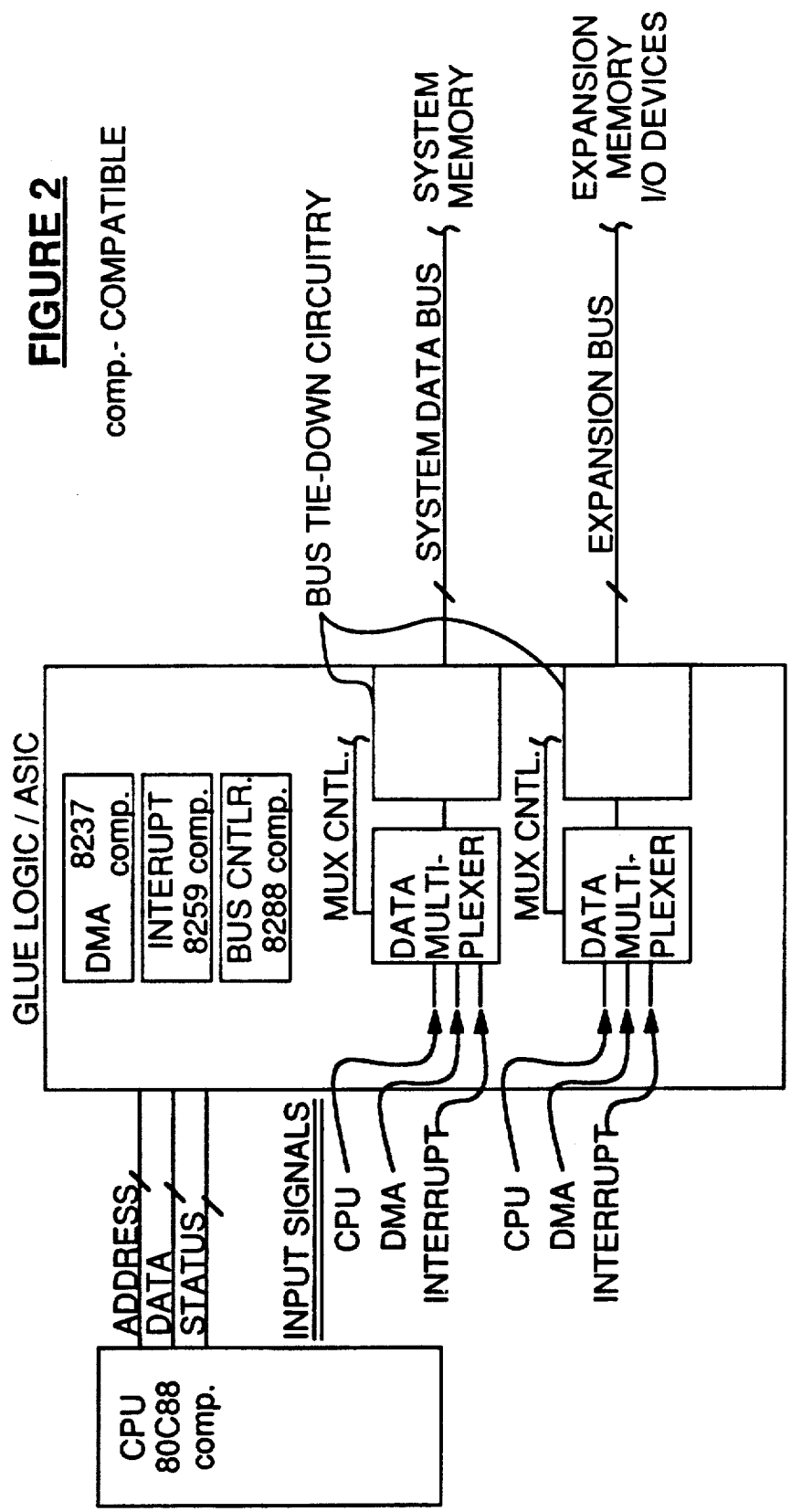

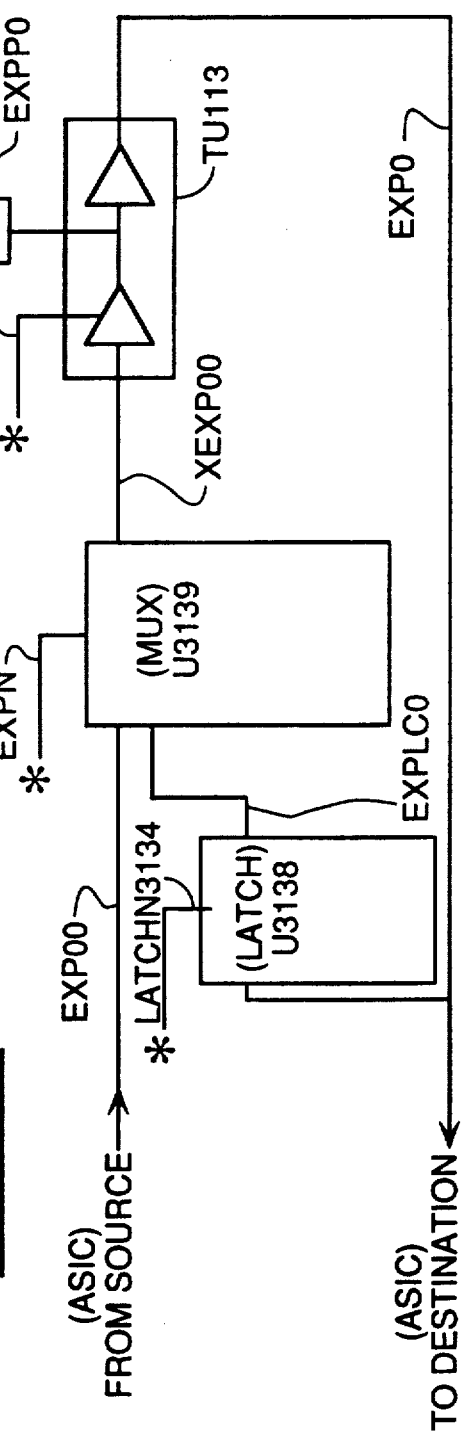
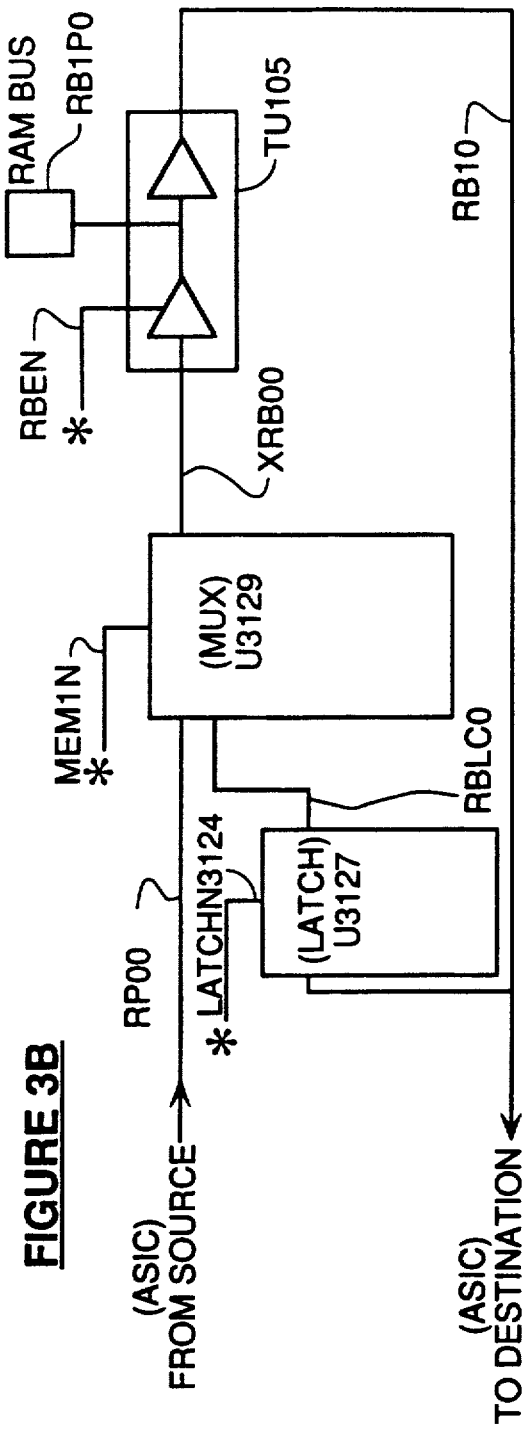
FIGURE 3A
FIGURE 3B

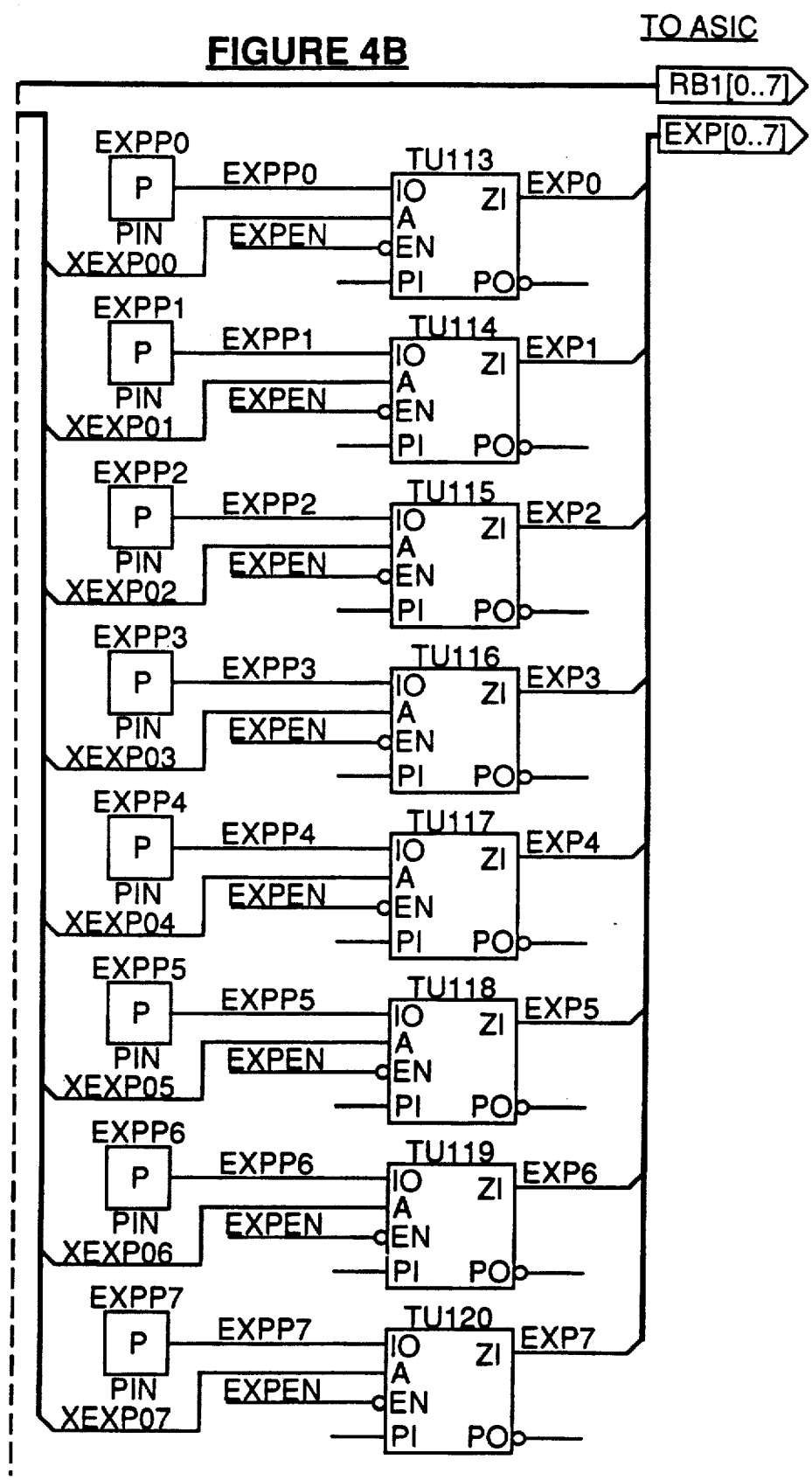

STRUCTURE AND METHOD FOR TYING DOWN AN UNUSED MULTI-USER BUS

FIELD OF THE INVENTION

This invention relates to computers which use buses for transferring information between integrated circuit devices and in particular to tying down buses in such a manner as to reduce power dissipation.

BACKGROUND OF THE INVENTION

A system bus in a computer can cause a power drain as a result of being left floating during periods of nonoperation. If the bus, which contains a plurality of conductive lines (sometimes called data lines or bit lines or bus lines or lines) on which signals are transmitted, is left floating during periods of nonoperation, circuit elements which are connected to the lines in the bus can move to an undesired state. This is especially true in CMOS circuitry because CMOS transistor pairs can receive a voltage level at which both transistors of the pair are conductive.

A standard industry design practice to deal with this problem is to connect a separate resistor from each line of the bus to a desired voltage source. When the bus is not operating, current passes through these resistors to adjust the voltage on the bus to the source voltage level. The problem with this solution is that where current passes through the resistors power loss results. Also, since one resistor is required for each data line, these resistors take up circuit board space. As computers get smaller and more portable, both space available for all the circuitry and the power used in the computer circuitry must be minimized. It is also beneficial to remove any unnecessary components to reduce the cost of the overall system.

FIG. 1 shows a typical way a central processing unit (CPU) is connected through an ASIC (Application Specific Integrated Circuit) device to drive data signals onto two buses in a computer system (only one bit line of each bus is shown). Each bit line of each bus has a pull-up resistor connected between it and a 5 volt source. The 80C88 compatible CPU, in FIG. 1, sends address, data, and status signals to the ASIC during operation. The ASIC with a 8237 compatible DMA, a 8259 compatible Interrupt Controller, a 8288 compatible Bus Controller, at least two data multiplexers (MUX) with MUX control signals inputs, with one MUX feeding through a buffer to a system (random access memory—RAM) bus, and one MUX feeding through a buffer to an expansion bus. A resistor is attached to each bit line of each bus and connected to a known voltage source.

The ASIC uses the above mentioned components as appropriate to place signals on the RAM bus and the expansion bus when the appropriate MUX control signal is provided during a normal operating cycle. Each resistor shown is typical for each bit line of a bus wherein said resistor pulls up (or can pull down) each bit line of a bus for bus stabilization. The resistance of the resistor is sufficiently high that during normal operation there is not enough current bleed across the resistor to or from the bus side of the circuit to distort the signal on the bus. When a normal operating cycle is completed the bus is left unconnected to any data source. If any bus line of an unconnected bus is at a different voltage than the voltage source on the other side of the resistor then current flows through the pull-up/pull-down resistor connected to that bus line until the source voltage level is reached by that bus line. Power is dissipated in the resistor as current flows to equalize the voltage on each side of the resistor. Each time a normal operating cycle ends, which can be many times a second, current flows in all resistors connected to bus lines where the source voltage is different than the bus voltage and power is dissipated, shortening battery life.

In another example of the prior art, where buses are directly tied to a central processing unit (CPU), several manufacturers, for example, Harris in their 80C88 device described at page 3-89 of their 1988 Digital Product Data Book, have addressed this problem by placing a bus hold circuit in the CPU with two inverters in series between the output of the output driver to the bus and the input of the input buffer from the bus. An example of a typical prior art bus hold circuit is shown in FIG. 1A. "Bus hold" circuits maintain a valid logic state if no driving source is present. In the Harris device mentioned above, to overdrive the "bus hold" circuits, an external driver must be capable of supplying 400 $\mu$A minimum sink or source current at valid voltage levels. Since this "bus hold" circuitry is active and not a "resistive" type, the associated power supply current is negligible. Power dissipation is significantly reduced when compared to the use of passive pull-up resistors. As with pull-up resistors, one "bus hold" circuit is required for each bus line.

Power dissipation is reduced in the circuitry of FIG. 1A when compared to pull-up or down resistors by avoiding switching the bus from a high or low state to its opposite state during the approximately fifty percent of the time the next active signal carried by the bus is the same as the previous signal carried by the bus.

The CPU type "bus hold" circuit shown in FIG. 1A is a circuit which maintains a logical zero or one based on a stronger signal without any external means for selecting between feedback and data signals to apply to the bus. It relies on internal resistance to override the "bus hold" inverters, providing no means for anticipating when the bus use will occur, and as a result can introduce timing delays and excessive current requirements when additional devices, including additional CPUs, are introduced to the bus.

SUMMARY OF THE INVENTION

This invention eliminates the need for pull-up resistors designed to stabilize a floating bus and also eliminates the timing delays and excessive current requirement which may occur when using prior art "bus hold" systems. This invention provides a circuit which actively monitors system bus activity. When the circuit determines that there is no bus activity the circuit stores and reapplies, during the period of inactivity, the last signal carried by the bus while active.

It performs this function by storing the last signals on the conductive lines in the bus in a latch and monitoring all computer functions which might require bus usage. When there is no bus use, the previous signal values which have been stored in a latch are routed to the bus, maintaining the lines in the bus at the previously known values on those lines. When bus use is imminent, i.e., a control signal indicating that a status or address signal indicating that the bus will be used has been received, the output signals from the latch are disconnected from the bus. New data signals are then allowed to be placed on the bus. Data in the form of signals from the CPU and DMA (direct memory access controller) are routed as signals through the circuitry of the ASIC of the first embodiment pictured in FIG. 2. Data from other peripheral devices may be routed as signals through the circuitry of the first embodiment or may go to the bus directly. In all cases, bus signals are monitored so that when the end of the current bus operation cycle is sensed the last value of the signal on the bus is stored in a latch. The output signal from the latch is then routed to the bus to maintain the bus at its last signal state.

In a computer having several buses, a separate tie-down circuit monitors the functions which use each bus and ties down that bus when the circuitry senses that that bus is inactive.

A second embodiment of this invention is identical to the first embodiment described above, except that the bus drive pin connection between the ASIC in which the tie-down circuitry resides and the circuit board on which the ASIC resides is eliminated. A signal IBUSDRV allows the tie-down circuitry to control the bus, and is high except when the circuit is being tested. In the first embodiment, this signal is taken from a circuit board source using a pin connection. The second embodiment obtains this same signal from an I/O mapped programmable register in the ASIC, thereby eliminating a pin connection to the circuit board with its associated space, manufacturing, reliability, and financial costs.

BRIEF DESCRIPTION OF THE DRAWINGS

FIG. 1 shows an example of a prior art bus system hold circuit with pull-up resistors.

FIG. 2 shows an example of the first embodiment of the invention.

FIGS. 3A and 3B show circuitry incorporating a first embodiment of the invention. A two bus system for use in a low power computer is shown.

FIGS. 4A and 4B show the buffers for the RAM bus and the EXPansion bus of FIG. 3.

DETAILED DESCRIPTION OF THE INVENTION

Figure 1A:
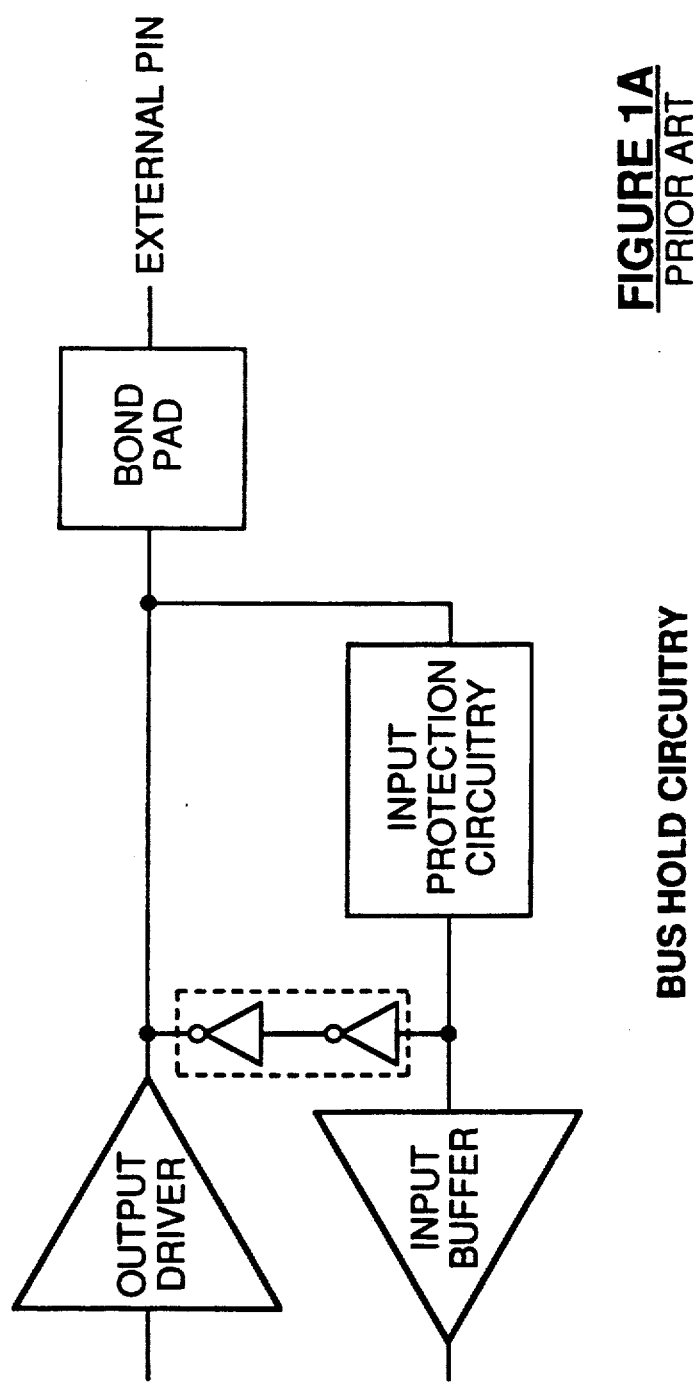
FIG. 1A shows a prior art "bus hold" circuit used in a CPU which uses a pair of inverters to apply the previous signal to the bus.

FIG. 2 shows the location of the tie-down circuitry in a computer system wherein the tie-down circuitry using pull-up resistors in FIG. 1 has been replaced by the tie-down circuitry of the first embodiment of the disclosed invention. Only one tie-down circuit is required per bus, and the tie-down circuitry is easily expandable and/or adaptable to other types of processors and buses and other bus widths, i.e., 4, 16, 32 bit width buses.

A DETAILED EXPLANATION OF THE FIRST EMBODIMENT

The circuits of FIGS. 3A and 3B picture circuits for controlling one pin in each of two buses, RAM bus pin RBIP0 (FIG. 3B) and EXPansion bus pin EXPP0 (FIG. 3A), which are tied-down using the method and structure of the present invention. Only one bit line of each bus is pictured. The lines identified with a star are control lines, not bus lines. Only one control line to each pictured device is needed per bus, regardless of the number of lines on the bus.

STATUS AND CONTROL SIGNALS

Each of the following signals is a status or control signal that the first embodiment uses to monitor bus activity. The origin and general function of each signal is described so that a detailed review of the processing of these signals as pictured in the drawings provides an understanding of the circuit's operation and function.

EXPANSION BUS SIGNALS

Figure 4A:
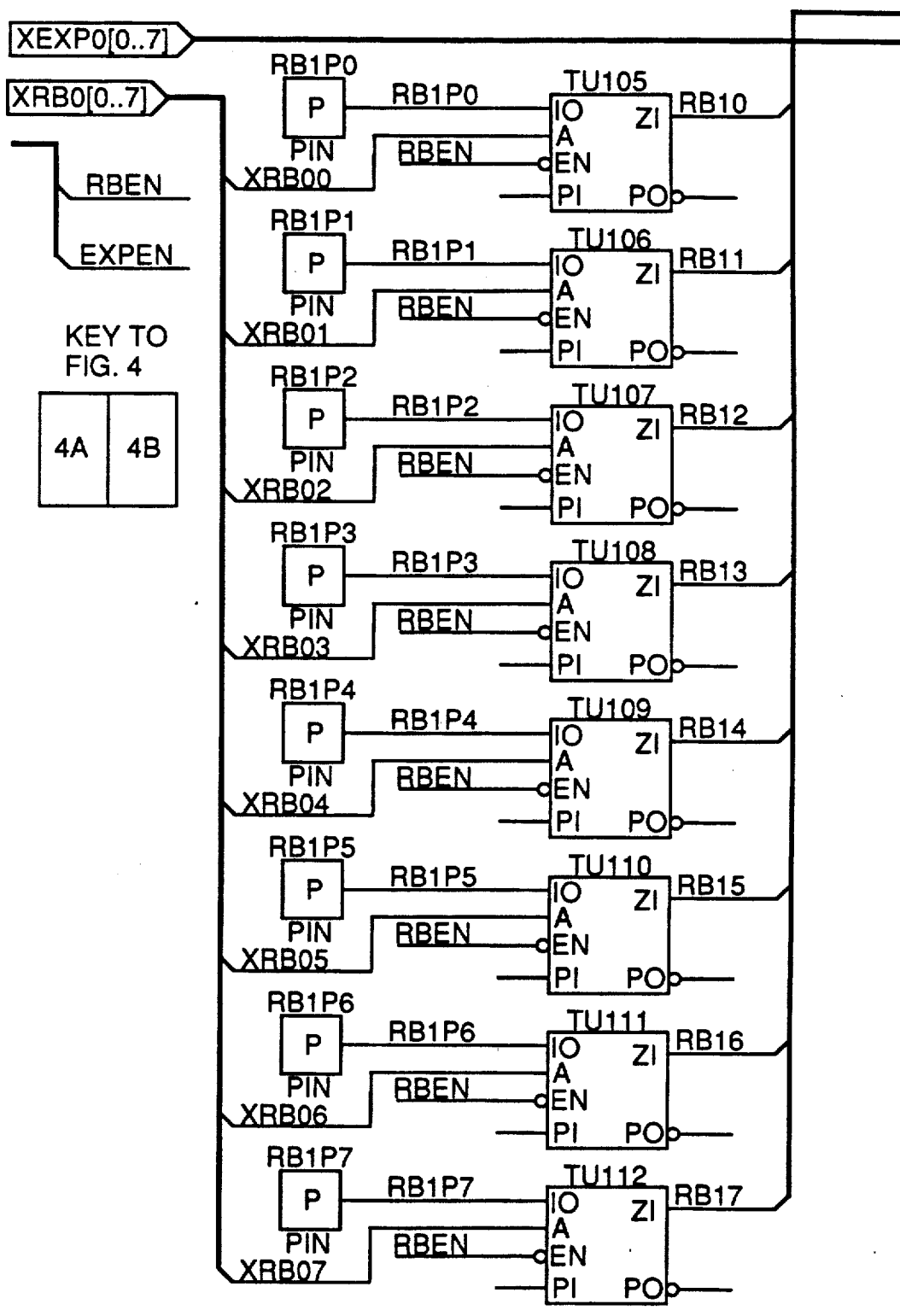

The operation of the circuitry associated with the EXPansion bus will be described. EXPansion bus pin EXPP0 (only one of 8 or more lines in the EXPansion bus) is connected to line XEXP00 through an output buffer controlled by signal EXPEN which must be enabled in order for data to flow from an ASIC which directs signals from different integrated circuit chips in the computer to the buffer (see FIG. 4 for a detailed view of TU113 and EXPP0).

EXPEN

When the control signal EXPEN is low (=zero) buffer TU113 is enabled. EXPEN is enabled when the ASIC is performing a write to the EXPansion bus or there is no bus activity. EXPEN is disabled when there is data flow from the bus to the ASIC or when there is other bus activity which requires that no data flow to the bus from the ASIC, i.e., when the bus is being written to by a first peripheral device or when it is being read by a second peripheral device.

Figure 7:
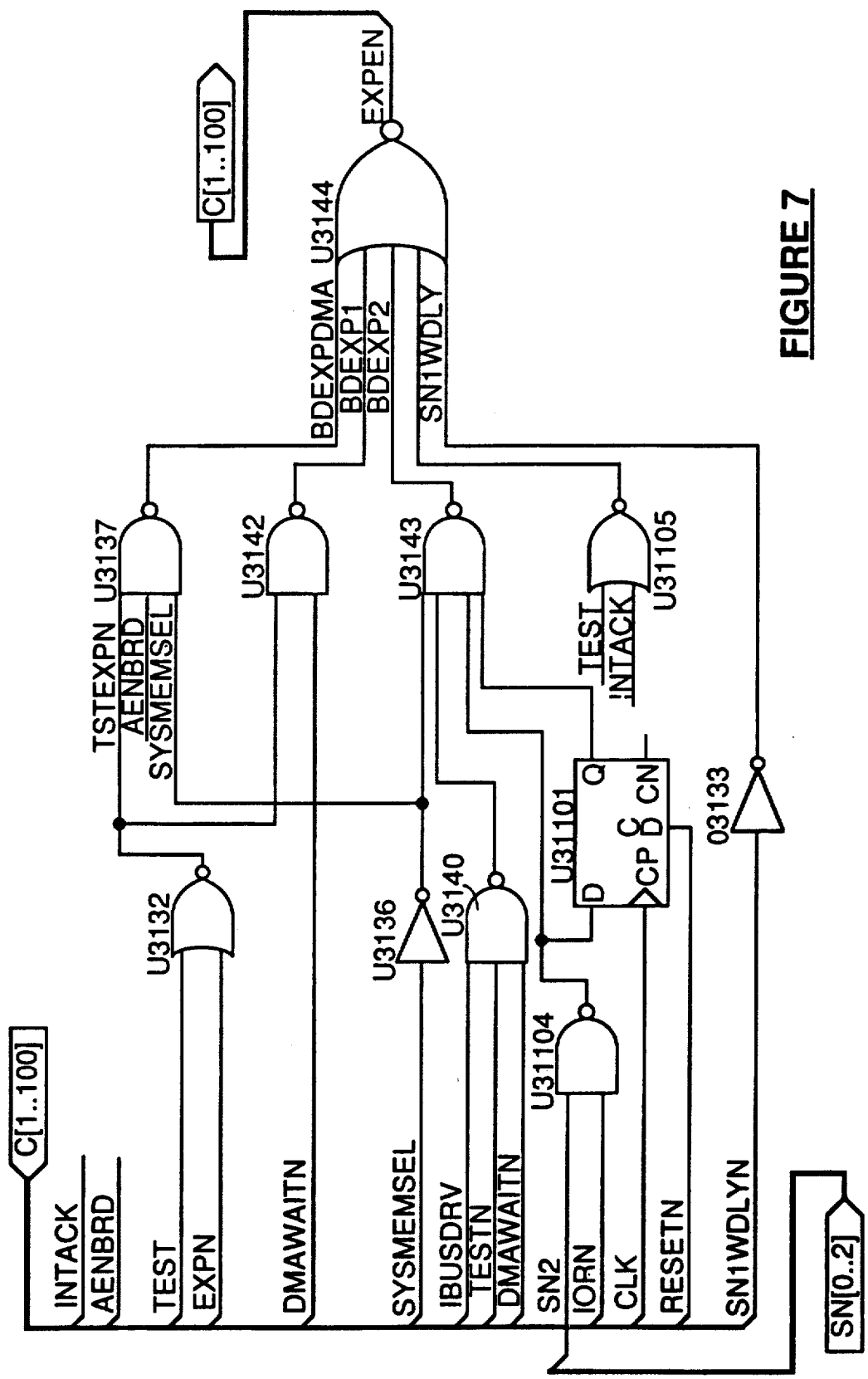
FIG. 7 shows circuitry which monitors bus status and provides a control signal to enable the EXPansion bus buffers shown in FIG. 4.

EXPEN enables buffers TU113, ..., TU120 (FIG. 3A & 4) to do a write operation on the EXPansion bus. EXPEN is derived from the inputs which are shown in FIG. 7. They are TEST, EXPN, DMAWAITN, SYSMEMSELN, IBUSDRV, TESTN, SN2, IORN, CLK, RESETN, SN1WDLYN, AENBRD, and INTACK, and perform as follows. Names of signals have been chosen to suggest their functions and to conform to requirements of the manufacturer of the ASIC chip, one of which is that the first character be alphanumeric and another of which is that the last letter is N for active low and a letter other than N for active high, except for INTACK which is active low.

TEST, TESTN

TEST is an active high signal to test the internal circuits of the ASIC. It puts the ASIC into a test mode to make sure that circuits are functioning properly. For example, if there a problem with a part from a vendor but the location of the problem is unknown, that part is put into a test mode. The user performs troubleshooting by generating inputs to the system and verifying outputs. The TEST signal is inactive (low) during normal system function. TESTN is the inverse signal of TEST.

EXPN

EXPN is derived from several other signals and controls MUX U3139, selecting whether latched data from latch U3138 or new data from an ASIC source is routed to buffer TU113. When EXPN is active (low) the bus is in use and data is flowing from the ASIC source to buffer TU113. When EXPN is inactive (high) data from latch U3138 is sent to buffer TU113.

Figure 5A:
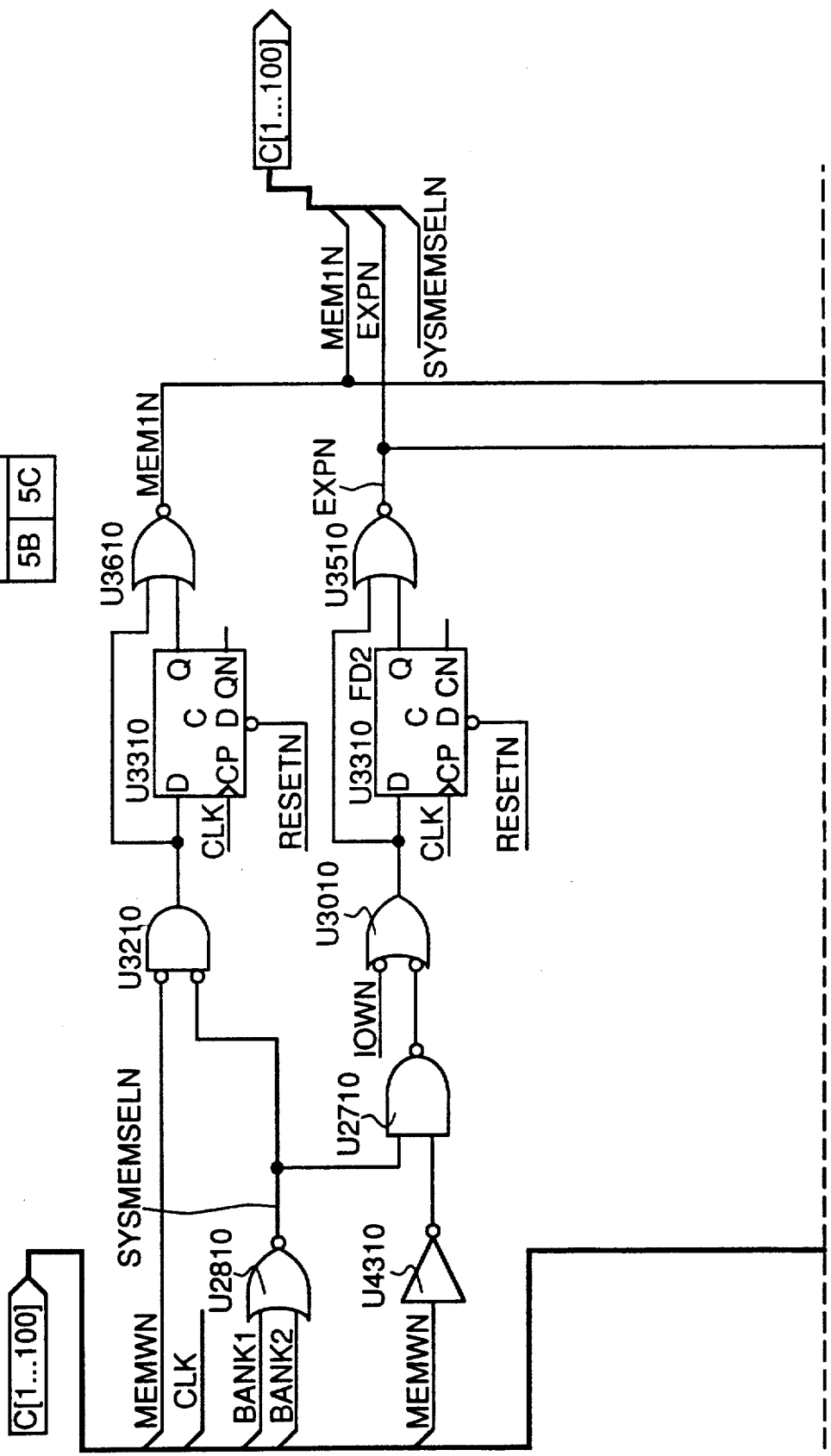
FIGS. 5A, 5B, and 5C show circuitry which monitors RAM and EXPansion bus status and provides control signals to select between applying new or last data signal values of each bus to their respective bus. The logic for "latch" control signals is also shown.
Figure 5B:
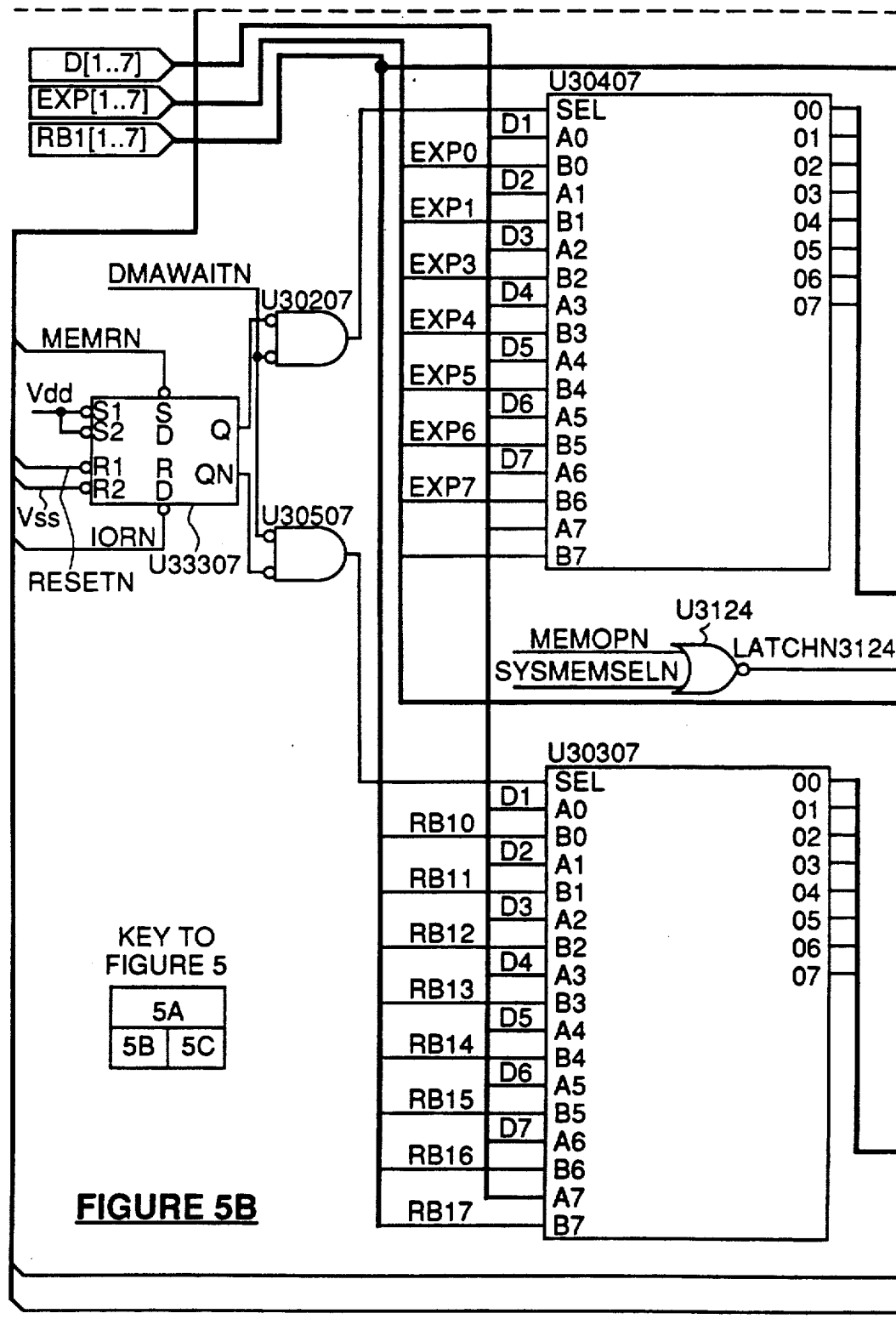
Figure 5C:
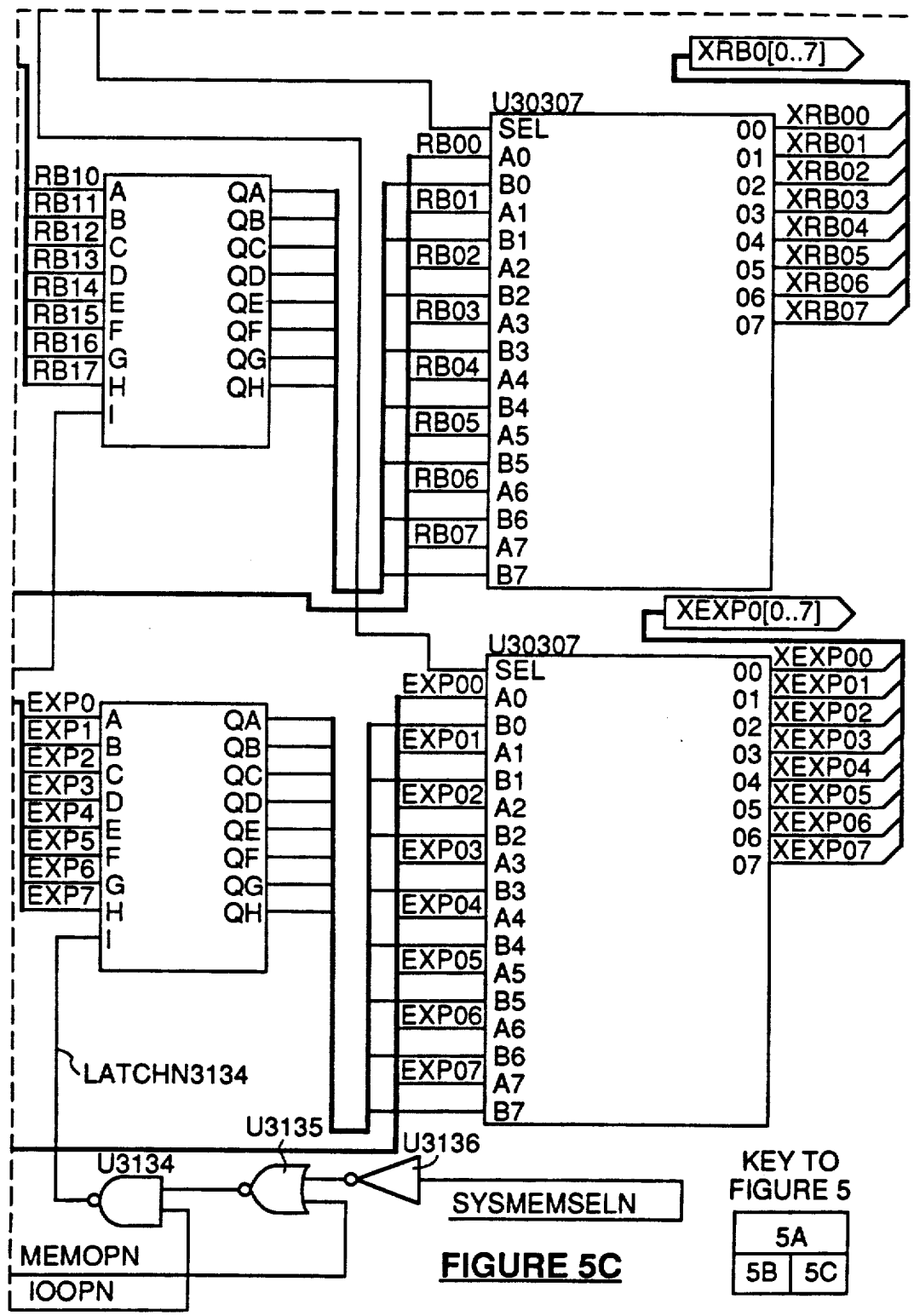

The derivation of EXPN is shown in FIG. 5. It is derived from inputs SYSMEMSELN (derived from inputs BANK1 and BANK2), MEMWN, IOWN, CLK, and RESETN. EXPN is active (low) when the computer is performing a write operation in memory above 512K or when an I/O write operation is being performed.

EXPN, once active, stays active until the memory write operation or the I/O write operation is complete. When signals MEMWN and IOWN (FIG. 5) go inactive one input signal of the two input NOR gate U3510 immediately becomes inactive, however the other input signal to this NOR gate comes from a D flip-flop which does not change its output signal to the NOR gate until the next positive edge of a clock signal is received. This causes the EXPN signal to be held active for an additional half clock cycle beyond the time MEMWN and IOWN become inactive (they become inactive on a negative edge (high to low transition) of a clock signal cycle). Once the positive edge of the clock signal arrives, the inactive state of inputs derived from MEMWN and IOWN is transferred through the D flip-flop, thereby causing EXPN to become inactive (high). This delay provides assurance that the operation causing data to be written to the bus is complete before allowing another data source to use the bus.

SYSMEMSELN

SYSMEMSELN is identical to address bit CA19, one of the signals from which it is derived. When SYSMEMSELN is active (low) then the system memory (<512K) is selected (in use); when it is inactive (high) memory beyond 512K is selected (in use), i.e., expansion bus memory.

Figure 8A:
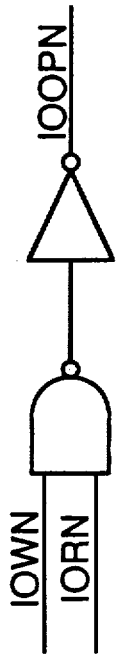
FIGS. 8A, 8B, 8C, and 8D show circuitry which monitors address, memory, and I/O control signals the derivations of which are inputs to FIG. 5.
Figure 8B:
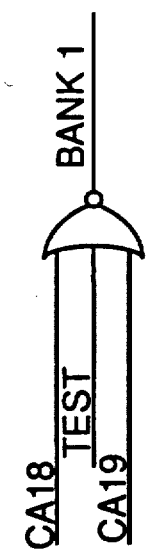
Figure 8C:
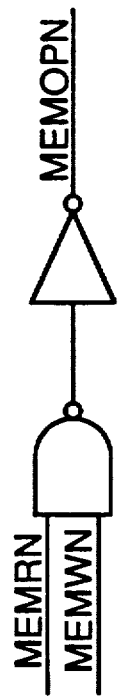
Figure 8D:
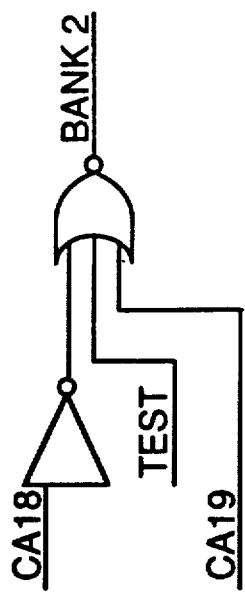

SYSMEMSELN (system memory select, used as an input to both EXPEN and EXPN, above) is derived from signals BANK1 and BANK2 which in turn are derived from address signals CA18 and CA19 shown in FIGS. 8B and 8D. Signals CA18 and CA19 are address bits from the CPU. The SYSMEMSELN signal is active (low) whenever address bit CA19 is low, and SYSMEMSELN is inactive (high) when CA19 is high. BANK1 and BANK2 are signals which indirectly connect SYSMEMSELN and CA19.

BANK1, BANK2

BANK1 and BANK2 denote signals which identify activity in their respective half of the 512K system memory. When bit CA19 is zero, indicating memory below 512K is selected, either BANK1 or BANK2 will be active (high). Address bit CA18 differentiates between activity in BANK1 and BANK2. If CA18 is zero, then BANK1 (the lower half of the 512K system memory) is selected, if CA18 is one then BANK2 (the upper half of the 512K system memory) is selected. When bit CA19 is one, neither BANK1 nor BANK2 are selected and memory activity is occurring outside the 512K system memory.

MEMWN

The MEMWN signal when active (low) indicates that a memory write operation is being performed.

IOWN

The IOWN signal when active (low) indicates that an I/O write operation is being performed.

MEMRN

The MEMRN signal when active (low) indicates that a memory read operation is being performed.

IORN

The IORN signal when active (low) indicates that an I/O read operation is being performed.

CLK

CLK is the system clock signal standard to all PC/AT type computers. The clock signals are used in the circuit described by the first embodiment in D flip-flops to maintain a signal at output until the positive edge of the next clock signal arrives.

RESETN

RESETN is a system reset signal standard to PC/AT types of computer systems. The "N" suffix indicated that it is an active low signal (=0).

DMAWAITN

The DMAWAITN signal when active (low) indicates that there is a DMA operation in progress. The signal remains active until the DMA operation cycle is complete and is ready for the next operation. An active DMAWAITN signal forces the CPU into a "wait" state, until the DMA operation is complete. (DMAWAITN is a well known signal name in a PC environment.)

IBUSDRV

Figure 6:
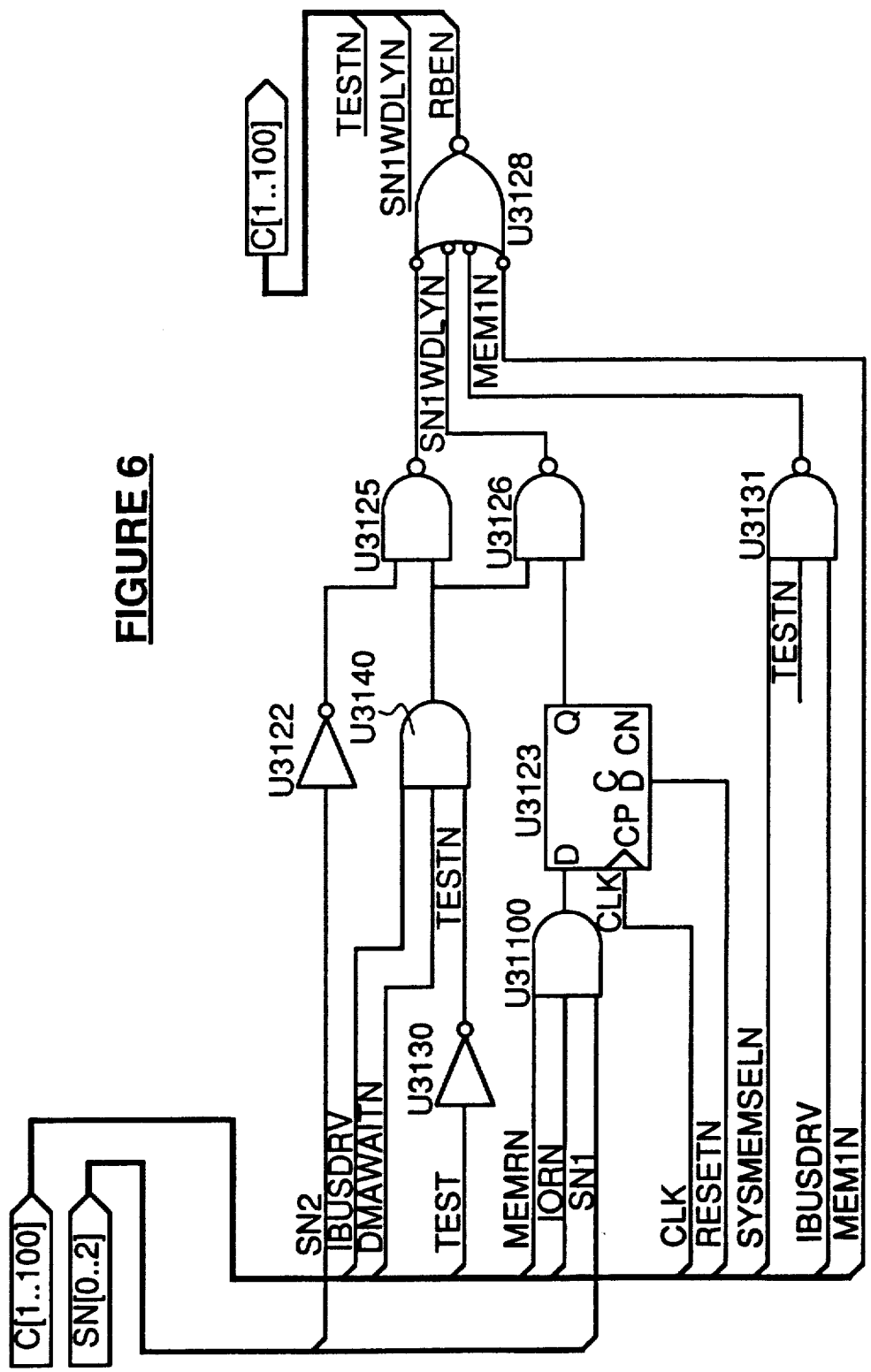
FIG. 6 shows circuitry which monitors bus status and provides a control signal to enable the RAM bus buffers shown in FIG. 4. The derivation of two other control signals is also shown.

IBUSDRV is a buffered bus hold enable signal for the EXPEN and RBEN control signals of the first embodiment (FIGS. 6, 7, and 9). In the first embodiment this signal is constantly high. When IBUSDRV is high and the bus is idle, the last known signal on the bus is applied to the bus. If IBUSDRV were low the last known signal on the bus would not be applied to the bus. This alternative would be used to disable the EXPEN and RBEN control signals during the time when the bus is idle and when the use of the hold circuitry is not desired, i.e., to do debugging, when troubleshooting other circuitry, when additional control of this circuitry is desired or at any other times when it might be useful to disable the idle bus hold circuitry.

Figure 9A:
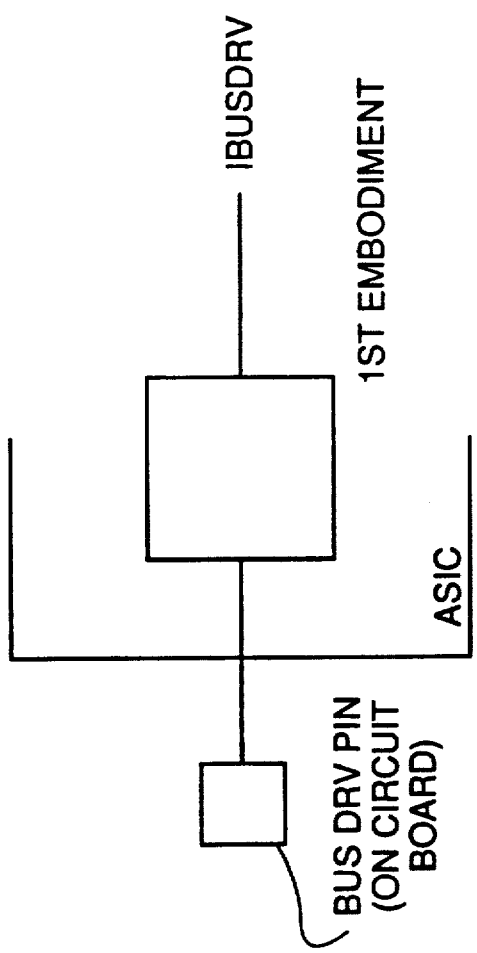
FIGS. 9A and 9B show circuitry which provides an enabling control signal to the tie-down circuit. The origin of this signal is shown for both the first and the second embodiment of the invention.

In the first embodiment of this invention the source for IBUSDRV comes from a pin on the circuit board where the ASIC is mounted (First Embodiment—FIG. 9A).

SN0, SN1, SN2

SN0, SN1, SN2 are standard CPU status signals which indicate the type of activity that is presently occurring in the computer according to the following table:

|  | SN2 | SN1 | SN0 |
|---|---|---|---|
| Interrupt Acknowledge | 0 | 0 | 0 |
| Read I/O | 0 | 0 | 1 |
| Write I/O | 0 | 1 | 0 |
| Halt | 0 | 1 | 1 |
| Instruction Fetch | 1 | 0 | 0 |
| Read Data from Memory | 1 | 0 | 1 |
| Write Data to Memory | 1 | 1 | 0 |
| Passive (no bus cycle) | 1 | 1 | 1 |

These signals are received and are used to generate other control signals, i.e., MEMRN, MEMWN, IORN, etc., at least one-half clock cycle before data signals are generated and applied to a bus. SN0 is not used directly in the first embodiment, but is one of the status signals used to generate other control signals (as described above) and is included in this table to provide a complete picture of bus status signals.

SN1WDLYN

SN1WDLYN (SN1 with delay) is a signal derived from several inputs pictured in FIG. 6. These inputs are IBUSDRV, DMAWAITN, TEST, MEMRN, IORN, SN1.CLK, and RESETN. This signal when active (low) indicates that a memory read or I/O read operation is occurring. The signal's transition between opposite states (either low to high or high to low) is delayed by D flip-flop U3123 in FIG. 6, which waits for the next positive edge of a clock signal CLK before its input signal is applied to its output line, at the time the positive edge (low to high transition) of the clock signal is received.

AENBRD

AENBRD when active (high) indicates that there is a DMA operation in progress. The signal remains active until the DMA operation cycle is complete. (AENBRD, address enable on board, is a well known signal name in a PC environment.)

INTACK

INTACK is a signal from the bus controller that signifies that an interrupt acknowledge cycle is in progress. It is active low. (INTACK, interrupt acknowledge, is a well known signal name in a PC environment.)

RAM BUS SIGNALS

The operation of the circuitry associated with the RAM bus will be described. RAM bus pin RBIPO (only one of 8 or more lines in the RAM bus) is connected to line XRBOO through an output buffer controlled by signal RBEN which must be enabled in order for data to flow from the ASIC to the buffer (see FIG. 4 for a detailed view of TU105 and RBIPO)

RBEN

When the control signal RBEN is low (= zero), the output side of buffer TU105 is enabled. RBEN is enabled when the ASIC is performing a write to the RAM bus or there is no bus activity. RBEN is disabled when there is data flow from the bus to the ASIC or when there is other bus activity which requires that no data flow to the bus from ASIC.

RBEN enables buffers TU105, ... , TU112 (FIG. 3B & 4) to do a write operation on the RAM bus.

The derivation of RBEN is shown on FIG. 6. It has inputs SN2, IBUSDRV, DMAWAITN, TEST, MEMRN, IORN, SN1, CLK, RESETN, SYSMEMSELN, and MEMIN. The derivations of all of these signals except for MEMIN has been described above.

MEMIN

MEMIN similar to EXPN above is a signal that is derived from several other signals and also is the control signal for MUX U3129, controlling whether latched data, from latch U3127 or new data, is routed to buffer TU105. When MEMIN is active (low) the bus is in use and data is flowing from the ASIC source to buffer TU105. When MEMIN is inactive (high) data from latch U3127 is sent to buffer TU105. The derivation of MEMIN is shown in FIG. 5. It has inputs SYSMEMSELN, MEMWN, CLK, and RESETN, all of which have been described above.

LATCHN3134

LATCHN3134 is the control signal for the expansion bus latch U3138, which when active (low) latches (stores) the signals on each line of the expansion bus. LATCHN3134 is active (low) when no read or write operation is being performed on the EXPansion bus. This control signal is shown on FIG. 5 and has the inputs SYSMEMSELN, MEMOPN and IOOPN. SYSMEMSELN has been derived above.

MEMOPN

MEMOPN is the output signal of an OR function based on the activity of signals MEMRN and MEMWN (FIG. 8C). Whenever a memory read or write operation is being performed MEMOPN will be active (low).

IOOPN

IOOPN is output signal of an OR function for the I/O write and read signals, IOWN and IORN, respectively (FIG. 8A). Whenever an I/O read or write is being performed, IOOPN will be active (low).

LATCHN3124

LATCHN3124 is the control signal for the RAM bus latch U3127, which when active (low) latches (stores) the signals on each line of the RAM bus. This signal is shown in FIG. 5. Its inputs are MEMOPN and SYSMEMSELN (derived above). This signal is active (low) when no memory operation is being performed on computer memory within 512K, i.e., memory attached to the RAM bus,

THE SYSTEM OPERATION

FIGS. 3A and 3B show an overview of an embodiment of the present invention. The operation of the circuitry associated with the expansion bus will be described first and subsequently the operation of the circuitry associated with the RAM bus will be described.

EXPANSION BUS (FIG. 3A)

The expansion bus is provided to allow the CPU and the DMA to access more than 512K of memory and I/O devices. One bus line of eight will be described, which is typical of the operation of all eight. During operation a bit signal residing on the expansion bus is connected to pin EXPP0. Expansion bus pin EXPP0 is connected through the output side of buffer TU113 to output line EXP0. EXP0 is connected to other parts of the ASIC and is an input signal to latch U3138. Latch U3138 has an enabling signal LATCHN3134 which when active provides that its input signal EXP0 will be applied on its output line EXPLC0 to multiplexer (MUX) U3139. MUX U3139 has two input lines for each output bus line, the previously mentioned input line EXPLC0, from latch U3138, and a second input line from a source in the ASIC, EXP00. MUX U3139 will route the signal on one of these two input lines to its output line XEXP00 depending on whether its control signal EXPN is active. XEXP00 is connected to the input line of buffer TU113 which is an enabling buffer. In order for data to flow through the buffer the buffer's enabling signal EXPEN must be active (low).

The expansion bus provides access from an ASIC chip to other integrated circuit chips in the computer. When data are coming from the ASIC to the expansion bus, the signal on line EXP00 is applied to MUX U3139. Since a write operation in memory above 512K (memory connected to the expansion bus) is being performed, EXPN causes the signal on line EXP00 to be applied to line XEXP00 through MUX U3139. This signal is applied to buffer TU113 and since a write operation is being performed on the expansion bus, EXPEN is enabling buffer TU113 to apply the signal to the bus.

If the ASIC is reading from the bus then signal EXPEN is disabled and no data flows through MUX U3139 to the bus EXPPO. The latch U3138 is continuously receiving all data on the bus.

Once it is determined that the read operation on the bus has been completed and that no other operation has started on the bus, the control signal LATCHN3134 changes state (becomes low) to latch the data signal which has been present on line EXP0 so that the output signal of latch U3138 is applied and maintained on line EXPLC0 to MUX U3139. As soon as monitored signals show that bus is in an idle state, the control signal to MUX U3139, EXPN, changes state (becomes inactive) to route the output of the latch to the buffer TU113, which is connected to the bus. Since the bus is idle, EXPEN is enabled, allowing the latched signal to be placed on the bus.

The data being written to the bus is being continuously read by latch U3138 which is connected to the bus through buffer TU113.

When the transition from a write operation to an idle state takes place, signals LATCHN3134 and EXPN cause the data signals from latch U3138 to be applied to buffer TU113 as data were applied in the read operation described above. However, since EXPEN is already enabling buffer TU113, its state is not changed when the transition from the write operation to the idle state takes place.

RAM BUS (FIG. 3B)

The RAM bus is provided to allow the CPU to access the 512K of system memory. One bus line of eight will be described, which is typical of the operation of all eight. During operation, a bit signal residing on the RAM bus is connected to pin RBIP0. RAM bus pin RBIP0 is connected to buffer TU105 which connects it to its output line RB10. RB10 is connected to other parts of the ASIC and is an input signal to latch U3127. Latch U3127 has an enabling signal LATCHN3124 which when active provides that its input signal RB10 will be applied on its output line RBLC0 to multiplexer (MUX) U3129. MUX U3129 has two input lines for each output bus line, the previously mentioned input line RBLC0, from latch U3127, and a second input line from a source in the ASIC, RB00. MUX U3129 will route the signal on one of these two input lines to its output line XRB00 depending on whether its control signal MEMIN is active. XRB00 is connected to the input line of buffer TU105 which is an enabling buffer. In order for data to flow through the buffer the buffer's enabling signal RBEN must be active (low).

The RAM bus provides access from an ASIC chip to system memory chips in the computer. When data is coming from the ASIC to the RAM bus, the signal on line RB00 is applied to MUX U3129. Since a write operation in the system memory (<512K) is being performed, MEMIN causes the signal on line RB00 to be applied to line XRB00 through MUX U3129. This signal is applied to buffer TU105 and since a write operation is being performed on the RAM bus, RBEN is enabling buffer TU105 to apply the signal to the bus.

If the ASIC is reading from the bus then signal RBEN is disabled and no data flows through MUX U3129 to the bus RBIPO. The latch U3127 is continuously receiving all data on the bus.

Once it is determined that the read operation on the bus has been completed and that no other operation has started on the bus, the control signal LATCHN3124 changes state (becomes low) to latch the data signal which has been present on line RB10 so that the output signal of latch U3127 is applied and maintained on line RBLC0 to MUX U3129. As soon as monitored signals show that bus is in an idle state, the control signal to MUX U3129, MEMIN, changes state to route the output of the latch to the buffer TU105, which is connected to the bus. Since the bus is idle, RBEN is enabled, allowing the latched signal to be placed on the bus.

The data being written to the bus is being continuously read by latch U3127 which is connected to the bus through buffer TU105.

When the transition from a write operation to an idle state takes place, signals LATCHN3124 and MEMIN cause the data signals on latch U3127 to be applied to buffer TU105 as data was applied in the read operation described above. However, since RBEN is already enabling buffer TU105, its state is not changed when the transition from the write operation to the idle state takes place.

DESCRIPTION OF THE SECOND EMBODIMENT

Figure 9B:
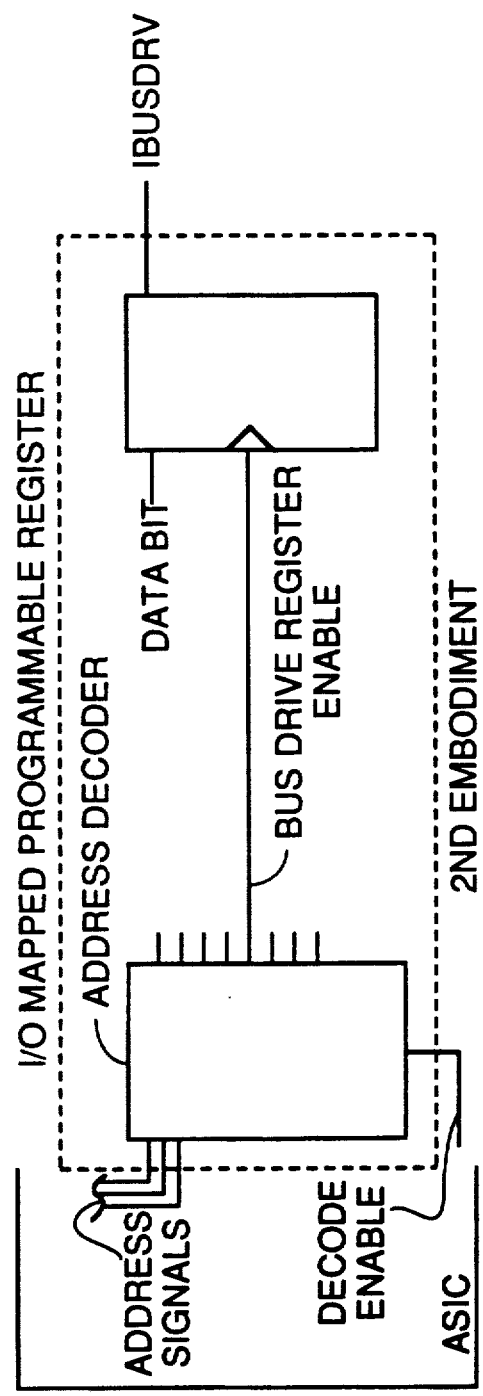

In the first embodiment, the source of signal IBUSDRV (described above) in the first embodiment is a pin on the circuit board (FIG. 9A). Every pin connection made to a circuit board introduces added potential for manufacturing defects and increases the cost of manufacturing due to the fact that a physical connection must be made between the integrated circuit pin and its terminal on the circuit board. I/O mapped programmable storage registers are available in the ASIC. The second embodiment of the invention eliminates the pin connection between the ASIC and the circuit board for the signal IBUSDRV and takes IBUSDRV, a constant high signal value, from a programmed control storage register, thereby eliminating disadvantages associated with the implementation of an additional pin on an integrated circuit (FIG. 9B).

These embodiments preferably operate in a low power computer of the type described in commonly assigned copending patent application Ser. No. 07/375,721, filed Jun. 30, 1989 entitled "Portable Low Power Computer", which is incorporated herein by reference.

Other embodiments of the present invention will become obvious to those skilled in the art in light of the above disclosure. The scope of the present invention is intended to include such other embodiments.

What is claimed is:

1. A method for tying down a multi-user computer bus connected to a plurality of bus using devices, said bus using devices generating status and address signals, said method comprising:

determining a data signal value last transmitted on said multi-user computer bus;

monitoring said status and address signals;

generating control signals in response to said monitored status and address signals;

routing to and maintaining on said multi-user computer bus said data signal value in response to said generated control signal.

2. A method of claim 1 wherein said step of determining said data signal value comprises:

monitoring signals on said multi-user computer bus;

routing said monitored signals to at least one data routing device; and storing said signal value last transmitted on said multi-user computer bus in said at least one data routing device.

3. A tiedown circuit connected between a multi-user computer bus and a plurality of bus using devices, said bus using devices generating status and address signals, said tiedown circuit comprising:

means for monitoring said status and address signals and for generating control signals in response to said status and address signals; and means, coupled to said means for monitoring, for routing to and maintaining on said multi-user computer bus a data signal value last transmitted on said multi-user computer bus in response to said control signals.

4. A tiedown circuit of claim 3 further comprising:

bus access means connected between said means for routing and said multi-user computer bus for routing said data signal value from said means for routing to said multi-user computer bus, and feedback means connected between said multi-user computer bus and said means for routing for feeding back said data signal value from said multi-user computer bus to said means for routing.

5. A tiedown circuit of claim 4 wherein said means for monitoring further generates a buffer control signal and a multiplexer control signal, said bus access means comprises a buffer and said means for routing comprises a multiplexer connected to said feedback means for receiving said data signal value from said multi-user computer bus, said multiplexer also receiving an original data signal from said bus using devices, said multiplexer routing to said buffer said original data signal when said multiplexer control signal is in a first state, and said multiplexer routing to said buffer said data signal value last transmitted when said multiplexer control signal is in a second state, said buffer routing said data signal value last transmitted or said original data signal to said multi-user computer bus when said buffer control signal is in a first state, said buffer routing no signal to said multi-user computer bus when said buffer control signal is in a second state.

6. A tiedown circuit of claim 5 further comprising means, connected between said feedback means and said multiplexer, for storing said data signal value last transmitted, said means for storing receiving said data signal value last transmitted from said feedback means and routing said data signal value last transmitted to said multiplexer.

7. A tiedown circuit of claim 6 wherein said means for monitoring further generates a latch control signal and said means for storing comprises a latch device, said latch device latching said data signal value last transmitted received from said feedback means when said latch control signal is in a first state and said means for storing continues to receive data signal values from said feedback means when said latch control signal is in a second state.

* * * * *